US011306228B2

(12) United States Patent
Markesinis et al.

(10) Patent No.: US 11,306,228 B2
(45) Date of Patent: Apr. 19, 2022

(54) HARDENING OF BONDING SYSTEMS

(71) Applicant: Catalytic Systems C.E.D. LTD, Nicosia (CY)

(72) Inventors: Karolos Markesinis, Salonika (GR); Efthalia Markesini, Salonika (GR); Dimitrios Alexandropoulos, Salonika (GR); Panagiotis Nakos, Kalamaria (GR); Paschalis Tsirogiannis, Panorama (GR)

(73) Assignee: Catalytic Systems C.E.D. LTD., Nicosia (CY)

( * ) Notice: Subject to any disclaimer, the term of this patent is extended or adjusted under 35 U.S.C. 154(b) by 0 days.

(21) Appl. No.: 16/320,668

(22) PCT Filed: Jul. 26, 2017

(86) PCT No.: PCT/EP2017/000903
§ 371 (c)(1),
(2) Date: Jan. 25, 2019

(87) PCT Pub. No.: WO2018/019419
PCT Pub. Date: Feb. 1, 2018

(65) Prior Publication Data
US 2019/0153274 A1 May 23, 2019

(30) Foreign Application Priority Data
Jul. 27, 2016 (GR) .............................. 20160100422

(51) Int. Cl.
| C09J 161/06 | (2006.01) |
| B27D 1/04 | (2006.01) |
| B27N 3/00 | (2006.01) |
| B27N 3/06 | (2006.01) |
| B32B 21/13 | (2006.01) |
| B32B 21/14 | (2006.01) |
| C08G 8/10 | (2006.01) |
| C08G 12/12 | (2006.01) |
| C08G 18/02 | (2006.01) |
| C08G 18/64 | (2006.01) |
| C08G 18/76 | (2006.01) |
| C08L 97/02 | (2006.01) |
| C09J 161/12 | (2006.01) |
| C09J 161/24 | (2006.01) |
| C09J 161/28 | (2006.01) |
| C09J 175/04 | (2006.01) |

(52) U.S. Cl.
CPC .............. *C09J 161/06* (2013.01); *B27D 1/04* (2013.01); *B27N 3/002* (2013.01); *B27N 3/06* (2013.01); *B32B 21/13* (2013.01); *B32B 21/14* (2013.01); *C08G 8/10* (2013.01); *C08G 12/12* (2013.01); *C08G 18/022* (2013.01); *C08G 18/6492* (2013.01); *C08G 18/7664* (2013.01); *C08L 97/02* (2013.01); *C09J 161/12* (2013.01); *C09J 161/24* (2013.01); *C09J 161/28* (2013.01); *C09J 175/04* (2013.01); *C08G 2170/20* (2013.01)

(58) Field of Classification Search
None
See application file for complete search history.

(56) References Cited

U.S. PATENT DOCUMENTS

| 3,677,884 A | 7/1972 | Bornstein | |
| 4,742,113 A * | 5/1988 | Gismond | ............... C09J 175/04 |
| | | | 524/762 |
| 2006/0057353 A1* | 3/2006 | Motter | ................... C08G 12/12 |
| | | | 428/297.4 |
| 2010/0047602 A1 | 2/2010 | Van Benthem | |
| 2014/0275352 A1* | 9/2014 | Breyer | .................... C08L 97/02 |
| | | | 524/14 |

FOREIGN PATENT DOCUMENTS

| CN | 1068585 A | | 2/1993 | |
| CN | 1209818 A | | 3/1999 | |
| CN | 102140327 A | | 8/2011 | |
| CN | 103747952 A | | 4/2014 | |
| GB | 996767 | | 6/1965 | |
| GB | 996767 A | * | 6/1965 | ............ C09J 175/04 |
| JP | 2002-069417 A | * | 3/2002 | |

OTHER PUBLICATIONS

PCT International Searching Authority; International Search Report and Written Opinion dated Jan. 2, 2018; entire document.
Office Action dated Jan. 6, 2021 issued by the Chinese Patent Office for Chinese Patent Application No. 201780052486.5. Entire document.

* cited by examiner

*Primary Examiner* — Randy P Gulakowski
*Assistant Examiner* — Ha S Nguyen
(74) *Attorney, Agent, or Firm* — Allen, Dyer, Doppelt & Gilchrist, P.A.

(57) ABSTRACT

The present invention provides bonding systems comprising a formaldehyde-based (urea-/melamine-/phenol-/resorcinol-formaldehyde or other combination) and/or a polymeric isocyanate resin system composition for bonding lignocellulosic materials to form panels and/or shaped products, which contain a resin hardener, also referred to as resin catalyst, characterised in that the hardener is activated by heat.

6 Claims, No Drawings

HARDENING OF BONDING SYSTEMS

BACKGROUND OF THE INVENTION

In the manufacture of panel products from ligno-cellulosic materials, an adhesive composition which is either a formaldehyde-based polycondensation resin system or a polymeric isocyanate adhesive system is added to the ligno-cellulosic materials, the resultant mixture is formed to a mat and is then placed in a press which applies heat and pressure to cure the adhesive, bond the lingo-cellulosic materials and form the final panel products.

Thus, for example, an adhesive composition will be mixed and applied to the fibres or chips of materials such as wood or other ligno-cellulosic materials in the forming of fibreboards or particleboards, or to the surface of wood strands or veneers in the forming of strandboards or plywood.

Such adhesive compositions are usually prepared prior to application in the form of a liquid mass called the glue mix which comprises the adhesive resin, some other additives and optionally the hardener, which catalyses and accelerates the curing of the resin or bonding agent in the hot press. Thus, one employs a formaldehyde-based (urea-/melamine-/phenol-formaldehyde or other) or a polymeric isocyanate adhesive and a hardening agent which is conventionally an acid/base or salt providing the acidity/basicity that is needed to harden and cure the adhesive resin. It is desired that this hardening action of the catalyst takes place during the hot pressing stage of the manufacturing process and not before it.

Blending such a hardening agent into the bonding agent or pre-polymer has the disadvantage that, if for any reason there is a delay in the manufacturing process between the preparation of the glue mix and the hot press infeed (e.g. delay between the blending of the polymer and hardening agent and application to the ligno-cellulosic material, delay between mat forming and placing in the hot press), then cure may proceed prematurely leading to the loss of bonding efficiency, called pre-curing. Particularly this is true when a free acid or base is employed and for that reason it is preferred to use a salt. On the other hand, salts are less active as hardening agents and therefore require longer time in the final heat/pressure stage than the free acids or bases. If, however, excessive amount of catalysing salts are used, then pre-curing may be experienced again.

Various means, such as the use of buffers, have been suggested for delaying the action of strong hardening agents, but, as indicated, these can have the undesirable effect of slowing down the reaction of the hardening agent once the product is in the final press stage of manufacture.

The pre-curing problem has been becoming more acute with the use of ligno-cellulosic materials or composite mat of elevated temperatures prior to the hot pressing stage, which again accelerates the action of the hardening agent prior to the optimum time and/or position.

The ammonium salts of strong acids are successful catalysts, especially in the case of resins with elevated content of free formaldehyde. This type of catalyst is activated by the reaction of formaldehyde with the ammonium part of the salt, liberating acid. The limitations of the bonding system containing ammonium salt catalyst were evident from the beginning of its use, however they became more profound as the resins' free formaldehyde content was lowered over the years. The free formaldehyde content in a modern resin can be up to 20 times lower as compared to a resin of traditional "E2" type according to European standard EN 13986. This low formaldehyde content limits significantly the efficiency of ammonium salt catalysts.

Heat-triggered catalysts have been proposed for acid curable resins like urea-formaldehyde, melamine-formaldehyde, urea-melamine-formaldehyde resins and the like. Such hardeners could resolve the aforementioned issues, provided the triggering temperature is enough. Notably, the temperature of the platens of the hot press is in the range of 110-250° C. depending on the shaped product type and on the details of the manufacturing process. Common type of such heat-triggered compounds is the salt of a volatile amine (e.g. triethylamine) with an acid of higher boiling point (e.g. sulphuric acid). The mechanism of acidification of this salt is based on the low boiling point of the amine (b.p. of triethylamine≅89° C.) when compared with the boiling point of the acid (b.p. of sulphuric acid≅338° C.). During application, the resin and catalyst system is heated and the amine is evaporating, leaving behind the acid which promotes curing and hardening of the resin.

Latent hardeners, activated by heating, for acid-catalysed curing of resins are disclosed in U.S. Pat. No. 3,317,474. In particular, compounds of the following formula are disclosed:

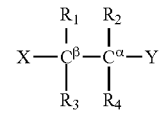

wherein X is the residue of a strong acid, for example of hydrochloric acid, and Y is a Lewis base moiety, which may contain nitrogen, oxygen or sulphur atoms, while residues of amines are preferred and disclosed as sole Lewis base moieties.

Compositions comprising acid-curable resins and latent catalysts of this type have long "pot life" or usability period (period of time after mixing of the resin with the catalyst till application to the substrate, during which the mixture should stay uncured or be only slightly pre-cured). These compositions require short curing times at elevated curing temperatures (e.g. during hot pressing of boards) and are able to cure at substantially uniform rates from the surface to the interior of a board.

The limitation of this technology is due to the heating pattern of the boards at the stage of hot pressing. Heat is applied to the two surfaces of the mat, forcing part of the existing water to become steam. The path that steam follows in the mat is from the two surfaces to the interior (core) of the mat, from where it is venting to the environment. This steam is the heating medium of the mat and that is the reason why the core temperature of the mat is rising progressively and not as rapidly as the temperature of the surfaces, which are in direct contact with the platens of the hot press. The heat-triggered catalysts of the above mentioned type will be triggered only when the temperature rises above the boiling point of the amine. In the interior layers of the mat, where the temperature is lower than the amine boiling point, the evaporated amine coming from the outer layers will condense, buffering those specific layers. So, until the catalyst is triggered, it delays the resin's curing in reverse order than wanted, i.e. ideally, it would be less active on the surfaces and more active towards the core, where the temperature is lower.

SUMMARY OF THE INVENTION

It is an object of the present invention to provide a bonding system comprising a formaldehyde-based (urea-/melamine-/phenol-/resorcinol-formaldehyde or other combination) and/or a polymeric isocyanate resin composition for bonding ligno-cellulosic materials to form shaped products, which contains a resin hardener also referred to as resin catalyst, characterised in that the hardener is activated by heat.

The catalyst used in the bonding system of the proposed invention is in the form of a salt formed by an acid moiety and a base moiety, and characterised in that either the acid moiety is the residue of a volatile acid or the base moiety is the residue of a volatile base. According to another embodiment, the catalyst or resin hardener is in the form of a volatile acid or of a volatile base.

The invention also provides a method of forming panels and/or shaped ligno-cellulosic based materials with a formaldehyde-based/poly-isocyanate bonding material under heat and pressure, in which the bonding material is used in combination with a resin hardener activated by heat, the said hardener being in the form of either a volatile acid or a volatile base or it is formed either as a salt of a volatile acid residue with a less volatile base residue or as a salt of a volatile base residue with a less volatile acid residue.

It has surprisingly been found that the proposed bonding systems provide significant savings by increasing the production speed of shaped products such as fibreboards or particleboards or oriented strandboards or plywood while maintaining superior product performance. The systems proposed by the present invention contain heat-activated catalysts which act as strong hardening agents when the lingo-cellulosic mat is in the hot press, but remain idle and/or neutral at lower temperatures. Such hardeners suppress premature curing (also called pre-curing) of the resin polymer during the stages of glue mix application, mat formation and transportation to the press, while they are significantly accelerating the resin curing process inside the press.

The novel features which are believed to be characteristic of the present invention together with further objects and advantages will be better understood from the following description.

DETAILED DESCRIPTION OF THE INVENTION

The present invention provides bonding systems comprising a formaldehyde-based (urea-/melamine-/phenol-/resorcinol-formaldehyde or other combination) and/or a polymeric isocyanate resin system composition for bonding ligno-cellulosic materials to form panels and/or shaped products, which contain a resin hardener also referred to as resin catalyst, characterised in that the hardener is activated by heat.

The catalysts used in the bonding systems of the proposed invention are in the form of a salt formed by an acid moiety and a base moiety and characterised in that either the acid moiety is the residue of a volatile acid, while the base moiety is the residue of a less volatile base, notably of a base with an elevated temperature boiling point, or the base moiety is the residue of a volatile base, while the acid moiety is the residue of a less volatile acid, notably of an acid with an elevated temperature boiling point.

The acid moiety of the salts used as catalysts in the proposed bonding systems can be derived from mineral and organic acids, mineral acids such as hydrochloric, hydrofluoric, hydroiodic, nitric, sulphurous, sulphuric, perchloric, persulphuric acid and the like and organic acids such as formic acid, acetic acid, propionic acid, butyric acid, isobutyric acid, maleic acid and the like.

The base moiety of the salts used as catalysts in the proposed bonding systems can be derived from amines, such as tertiary amines (trimethylamine, triethylamine, tripropylamine, methyldiethanolamine, trimethanolamine, triethanolamine, triisopropanolamine and the like.

According to another embodiment of the proposed invention, the catalyst or resin hardener used is in the form of either a volatile acid or a volatile base of the type above described.

It has surprisingly been found that either the salts derived from combinations of the above described acid and base moieties or the single acids or bases of the above described types can be advantageous heat-activated catalysts for the curing of formaldehyde-based resins, notably urea-formaldehyde resins, melamine-formaldehyde resins, phenol-formaldehyde resins, resorcinol-formaldehyde resins and their combinations, and/or poly-isocyanate/polyurethane resins, notably polymers formed by reaction between isocyanates and polyols. All these resins are thermosetting polymers or thermosets, whose pre-polymer viscous state changes irreversibly into the insoluble polymer network upon the curing induced by the action of heat and pressure, during the hot pressing stage of the production of shaped products, and which curing is accelerated by the catalysts of the proposed invention.

The poly-isocyanate resins of the proposed invention can be derived from aromatic isocyanates, notably diphenylmethane diisocyanate (MDI) and toluene diisocyanate (TDI) or aliphatic isocyanates, such as hexamethylene diisocyanate (HDI) or isophorone diisocyanate (IPDI). Furthermore, the proposed polymeric isocyanate resins can be derived from poly-hydroxy functional compounds of petrochemical and/or other origin, which may react with the afore-described isocyanates to form the poly-isocyanate/polyurethane resins.

The bonding systems of the proposed invention comprising of formaldehyde-based and/or poly-isocyanate resins and heat-activated catalysts, can thus be applied in the manufacture of shaped products from wood or other lingo-cellulosic materials, such as such as low-, medium- and high-density-fibreboards (the last two also known as MDF and HDF), particleboards, oriented strandboards, plywood and the like.

The heat-activated hardeners used in the proposed systems act as strong hardening agents at the stage of hot pressing of board manufacture when the lingo-cellulosic mat is in the hot press, but remain idle and/or neutral at lower temperatures. Such hardeners suppress premature curing of the thermosetting resin during the stages of glue mix application, mat formation and transportation to the press, while they are significantly accelerating the resin curing process inside the press.

Due to the higher volatility of the active component (acid or base depending on the type of curable resin) of the novel hardeners and the higher temperature of the board outer layers as compared to the interior and/or core layers, the active component is flowing from the outer layers of the mat towards the core together with the steam that is present in the system. This creates a constant stream of hardening agent towards the core almost throughout the whole board curing process, while leaving the board surfaces much less prone to pre-curing.

The use of the proposed bonding systems containing the novel hardeners in the production of shaped products such as fibreboards or particleboards or oriented strandboards or plywood and the like offers significant savings, by allowing the increase of the production speed and/or the decrease of resin consumption while maintaining superior board product performance.

During the process of manufacturing the said panels and/or shaped products, the proposed bonding systems can be admixed with various extenders or filler materials, such as wood flour and the like and can be also admixed with other materials such as release agents, viscosity modifiers, plasticizers, pigments, water resistance or hydrophobicity agents and the like, thus forming the glue mix that is applied for the bonding of the lingo-cellulosic materials and the forming of shaped products.

In the case of multi-layer products, the novel catalysts of the present invention can be applied in the glue mix of either the surface layers only or both surface and core layers.

Another way of application of the proposed novel hardeners is via spraying on the two surfaces (top and bottom) of the lingo-cellulosic mat, using appropriate spraying devices.

It has surprisingly been found that in the case of adding the novel hardeners only in the surface layers of the shaped products (otherwise boards or panels), complete curing of the formaldehyde-based and/or poly-isocyanate resin systems used can be achieved in the core layers of the boards too, and although no hardener has been added therein.

The proposed invention thus allows the novel application of the resin hardeners only in the surface layers of the composite mat while maintaining production speed and superior board product performance. The use of the proposed bonding systems may further allow the increase of the production speed and/or the decrease of resin consumption as effected by avoiding resin premature curing.

The catalysts of the proposed invention can also be used in combination with conventional curing catalysts, such as, for example, ammonium sulphate, ammonium chloride, ammonium nitrate and the like. For example, both conventional and novel catalysts according to the present invention can be employed in the glue mix, wherein the amount of conventional catalyst is less than the amount normally needed for the curing of the resin. The addition of novel catalyst in such a case helps to obtain curing characteristics not obtainable from the conventional catalyst alone.

The application of the proposed bonding systems containing formaldehyde-based and/or polymeric isocyanate resins and novel hardeners can allow the use of methods and processes, which although can accelerate production speed and/or offer significant production savings, they are, however, not used only because they promote pre-curing.

Thus, for example, ligno-cellulosic materials of elevated temperature can be used during the glue mix application and prior to the hot pressing stage, thereby bringing increased productivity, energy and chemicals savings in the production process. Particleboard production and post-dryer MDF/HDF resination systems, among others, will significantly benefit from the application of the proposed bonding systems.

The superiority of the bonding systems of the present invention can be easily observed in the case of MDF and/or HDF production, where the lingo-cellulosic mat is uniform and for this reason, until now, it was not possible to have a reactive core layer without causing severe pre-curing in the surface or face layers.

When the proposed novel hardeners are applied by spraying devices on the top and bottom surfaces of the mat, continuous acidification or basification of the mat core during the boards' occupation of the press takes place, while the surfaces are buffered with the less volatile component of the hardener, thus obtaining smoother board surfaces, which require less sanding to remove the over-cured material.

The present invention and its features may be better understood by referring to the accompanying examples involving specific embodiments of this invention. The examples are intended for illustration purposes only and should not in any sense be construed as limiting the scope of the present invention.

EXAMPLE 1

A bonding system containing a urea-formaldehyde (UF) resin in combination with triethanolamine propionate hardener salt was used for the production of laboratory three layer particleboards. The hardener was in the form of an aqueous solution with a concentration of 40% w/w of triethanolamine propionate salt (LH1).

Reference particleboards were produced in parallel to the ones containing the bonding systems of the proposed invention, using a glue mix prepared from the same UF resin and conventional ammonium sulphate hardener ($(NH_4)_2SO_4$). In all cases, the resin level was 8% and 10% w/w (resin solids on solid wood) in the core and surface layers respectively. Both the novel and the conventional hardener were applied at a level of 3% w/w (hardener solids on resin solids) in three different ways: (a) the hardeners were added only in the glue mix for the core layers, (b) the hardeners were added only in the glue mix for the surface layers, and finally (c) the hardeners were sprayed on both the top and bottom surface layers.

The hot press temperature used for the production of the boards was 240° C. The pressing time was 4 s/mm. The dimensions of the boards were 45×45×1.5 cm and the target board density was 630 kg/m$^3$.

The mechanical properties of the boards thus obtained were determined according to the European standards EN 310 (Bending strength (MOR) and Bending stiffness/Modulus of elasticity (MOE)) and EN 319 (Tensile strength/Internal bond (TB)) and the results are presented in Table 1:

TABLE 1

| | Formulation | | | | | |
|---|---|---|---|---|---|---|
| | 1 | 2 | 3 | 4 | 5 | 6 |
| Hardener type | $(NH_4)_2SO_4$ | $(NH_4)_2SO_4$ | $(NH_4)_2SO_4$ | LH1 | LH1 | LH1 |
| Hardener level | 3% | 3% | 3% | 3% | 3% | 3% |
| Hardener addition method | In the core mix | In the surface mix | Sprayed on surface layers | In the core mix | In the surface mix | Sprayed on surface layers |
| IB, N/mm$^2$ | 0.53 | 0.08 | 0.12 | 0.35 | 0.75 | 0.72 |
| MOR, N/mm$^2$ | 13.1 | 8.5 | 9.0 | 12.5 | 13.0 | 12.6 |
| MOE, N/mm$^2$ | 2650 | 1450 | 1560 | 2430 | 2650 | 2540 |

EXAMPLE 2

A bonding system containing a polymeric diphenylmethane diisocyanate (pMDI) resin in combination with trimethylamine maleate hardener salt was used for the production of laboratory three layer particleboards. The hardener was in the form of an aqueous solution with a concentration of 16% w/w of trimethylamine maleate salt (LH2).

Reference particleboards were produced in parallel to the ones containing the bonding systems of the proposed invention, using a glue mix prepared from the same pMDI resin and conventional glycerol ethoxylate hardener (GEH). In all cases, the resin level was 2.5% and 3% w/w (resin solids on solid wood) in the core and surface layers respectively. Both the novel and the conventional hardener were applied at a level of 15% w/w (hardener solids on resin solids) in three different ways, as described in Example 1.

The hot press temperature used for the production of the boards was 240° C. The pressing time was 4 s/mm. The dimensions of the boards were 45×45×1.5 cm and the target board density was 630 kg/m$^3$.

The mechanical properties of the boards thus obtained were determined according to the European standards EN 310 and EN 319 and the results are presented in Table 2:

TABLE 2

| | Formulation | | | | | |
|---|---|---|---|---|---|---|
| | 1 | 2 | 3 | 4 | 5 | 6 |
| Hardener type | GEH | GEH | GEH | LH2 | LH2 | LH2 |
| Hardener level | 15% | 15% | 15% | 15% | 15% | 15% |
| Hardener addition method | In the core mix | In the surface mix | Sprayed on surface layers | In the core mix | In the surface mix | Sprayed on surface layers |
| IB, N/mm$^2$ | 0.43 | 0.22 | 0.24 | 0.40 | 0.65 | 0.68 |
| MOR, N/mm$^2$ | 16.1 | 10.5 | 12.0 | 16.5 | 15.0 | 14.6 |
| MOE, N/mm$^2$ | 3150 | 2850 | 2980 | 3140 | 3350 | 3230 |

EXAMPLE 3

A bonding system containing a phenol-formaldehyde (PF) resin in combination with trimethylamine maleate hardener salt was used for the production of laboratory three layer particleboards. The hardener was in the form of an aqueous solution with a concentration of 16% w/w of trimethylamine maleate salt (LH2).

Reference particleboards were produced in parallel to the ones containing the bonding systems of the proposed invention, using a glue mix prepared from the same PF resin and conventional glycerol triacetate hardener (GTAH). In all cases, the resin level was 6% and 8% w/w (resin solids on solid wood) in the core and surface layers respectively. Both the novel and the conventional hardener were applied at a level of 5% w/w (hardener solids on resin solids) in three different ways as described in Example 1.

The hot press temperature used for the production of the boards was 240° C. The pressing time was 8 s/mm. The dimensions of the boards were 45×45×1.5 cm and the target board density was 680 kg/m$^3$.

The mechanical properties of the boards thus obtained were determined according to the European standards EN 310 and EN 319 and the results are presented in Table 3:

TABLE 3

| | Formulation | | | | | |
|---|---|---|---|---|---|---|
| | 1 | 2 | 3 | 4 | 5 | 6 |
| Hardener type | GTAH | GTAH | GTAH | LH2 | LH2 | LH2 |
| Hardener level | 5% | 5% | 5% | 5% | 5% | 5% |
| Hardener addition method | In the core mix | In the surface mix | Sprayed on surface layers | In the core mix | In the surface mix | Sprayed on surface layers |
| IB, N/mm$^2$ | 0.64 | 0.35 | 0.38 | 0.38 | 0.69 | 0.65 |
| MOR, N/mm$^2$ | 18.5 | 14.2 | 12.9 | 14.1 | 17.8 | 18.7 |
| MOE, N/mm$^2$ | 2840 | 2450 | 2620 | 2570 | 2910 | 2880 |

EXAMPLE 4

A bonding system containing a urea-formaldehyde (UF) resin in combination with triethanolamine propionate hardener salt was used for the production of MDF panels at industrial scale. The hardener was in the form of an aqueous solution with a concentration of 40% w/w of triethanolamine propionate salt (LH1).

Reference boards were produced in parallel to the ones containing the bonding systems of the proposed invention, using a glue mix prepared from the same UF resin and conventional ammonium sulphate hardener (($NH_4$)$_2SO_4$). In all cases, the resin level was 12% w/w (resin solids on solid wood). Both the novel and the conventional hardener were applied at a level of 1% w/w (hardener solids on resin solids) in two different ways: (a) the hardeners were added in the blow-line and therefore admixed with the total of fibres forming the composite mat, and (b) the hardeners were sprayed on both the top and bottom surfaces of the mat.

The hot press temperature used for the production of the boards was 240° C., 230° C., 210° C., 190° C. per zone. The pressing time was 6.5 s/mm. The board target thickness was 16 mm and the target board density was 750 kg/m$^3$.

The mechanical properties of the boards thus obtained were determined according to the European standards EN 310 and EN 319 and the results are presented in Table 4:

TABLE 4

| | Formulation | | | |
|---|---|---|---|---|
| | 1 | 2 | 3 | 4 |
| Hardener type | ($NH_4$)$_2SO_4$ | ($NH_4$)$_2SO_4$ | LH1 | LH1 |
| Hardener level | 1% | 1% | 1% | 1% |
| Hardener addition method | In the blow-line | Sprayed on mat surfaces | In the blow-line | Sprayed on mat surfaces |
| IB, N/mm$^2$ | 0.68 | 0.43 | 0.72 | 0.76 |
| MOR, N/mm$^2$ | 28.1 | 22.0 | 26.5 | 25.6 |
| MOE, N/mm$^2$ | 2650 | 1560 | 2430 | 2540 |

EXAMPLE 5

A bonding system containing a polymeric diphenylmethane diisocyanate (pMDI) resin in combination with trimethylamine maleate hardener salt was used for the production of three layer particleboards at industrial scale. The hardener was in the form of an aqueous solution with a concentration of 16% w/w of trimethylamine maleate salt (LH2).

Reference particleboards were produced in parallel to the ones containing the bonding systems of the proposed invention, using a glue mix prepared from the same pMDI resin and conventional glycerol ethoxylate hardener (GEH). In all cases, the resin level was 3% and 3% w/w (resin solids on solid wood) in the core and surface layers respectively. Both the novel and the conventional hardener were applied at a level of 2% w/w (hardener solids on resin solids) in two different ways: (a) the hardeners were added only in the glue mix for the core layers, and (b) the hardeners were sprayed on both the top and bottom surface layers.

The hot press temperature used for the production of the boards was 240° C., 230° C., 220° C., 210° C. per zone. The pressing time was 5.5 s/mm. The board target thickness was 18 mm and the target board density was 620 kg/m$^3$.

The mechanical properties of the boards thus obtained were determined according to the European standards EN 310 and EN 319 and the results are presented in Table 5:

TABLE 5

| | Formulation | | | |
|---|---|---|---|---|
| | 1 | 2 | 3 | 4 |
| Hardener type | GEH | GEH | LH2 | LH2 |
| Hardener level | 2% | 2% | 2% | 2% |
| Hardener addition method | In the core mix | Sprayed on surface layers | In the core mix | Sprayed on surface layers |
| IB, N/mm$^2$ | 0.32 | 0.25 | 0.28 | 0.52 |
| MOR, N/mm$^2$ | 7.5 | 6.8 | 7.8 | 8.5 |
| MOE, N/mm$^2$ | 1650 | 1530 | 1690 | 1870 |

EXAMPLE 6

A bonding system containing a urea-formaldehyde (UF) resin in combination with butyric acid (BA) hardener was used for the production of laboratory three layer particleboards.

Reference particleboards were produced in parallel to the ones containing the bonding systems of the proposed invention, using a glue mix prepared from the same UF resin and conventional ammonium sulphate hardener (($NH_4$)$_2SO_4$). In all cases, the resin level was 8% and 10% w/w (resin solids on solid wood) in the core and surface layers respectively. Both the novel and the conventional hardener were applied at a level of 3% w/w (hardener solids on resin solids) in three different ways: (a) the hardeners were added only in the glue mix for the core layers, (b) the hardeners were added only in the glue mix for the surface layers, and finally (c) the hardeners were sprayed on both the top and bottom surface layers.

The hot press temperature used for the production of the boards was 240° C. The pressing time was 4 s/mm. The dimensions of the boards were 45×45×1.5 cm and the target board density was 630 kg/m$^3$.

The mechanical properties of the boards thus obtained were determined according to the European standards EN 310 (Bending strength (MOR) and Bending stiffness/Modulus of elasticity (MOE)) and EN 319 (Tensile strength/Internal bond (TB)) and the results are presented in Table 6:

TABLE 6

| | Formulation | | | | | |
|---|---|---|---|---|---|---|
| | 1 | 2 | 3 | 4 | 5 | 6 |
| Hardener type | ($NH_4$)$_2SO_4$ | ($NH_4$)$_2SO_4$ | ($NH_4$)$_2SO_4$ | BA | BA | BA |
| Hardener level | 3% | 3% | 3% | 3% | 3% | 3% |
| Hardener addition method | In the core mix | In the surface mix | Sprayed on surface layers | In the core mix | In the surface mix | Sprayed on surface layers |
| IB, N/mm$^2$ | 0.45 | 0.13 | 0.09 | 0.38 | 0.42 | 0.39 |

TABLE 6-continued

| | Formulation | | | | | |
|---|---|---|---|---|---|---|
| | 1 | 2 | 3 | 4 | 5 | 6 |
| MOR, N/mm$^2$ | 12.4 | 9.7 | 9.2 | 10.0 | 10.5 | 11.6 |
| MOE, N/mm$^2$ | 2340 | 1550 | 1540 | 2100 | 2140 | 2280 |

EXAMPLE 7

A bonding system containing a urea-formaldehyde (UF) resin and a combination of conventional ammonium sulphate hardener (($NH_4)_2SO_4$) with triethanolamine propionate hardener (LH1) was used for the production of laboratory three layer particleboards.

Reference particleboards were produced in parallel to the ones containing the bonding systems of the proposed invention, using a glue mix prepared from the same UF resin and only conventional ammonium sulphate hardener (($NH_4)_2SO_4$). In all cases, the resin level was 8% and 10% w/w (resin solids on solid wood) in the core and surface layers respectively. Both the combination of novel and conventional hardener and the conventional hardener alone were applied at a total level of 3% w/w (hardener solids on resin solids) in three different ways: (a) the hardeners were added only in the glue mix for the core layers, (b) the hardeners were added only in the glue mix for the surface layers, and finally (c) the hardeners were sprayed on both the top and bottom surface layers. In the case of using the combination of novel and conventional hardener, the level of conventional ammonium sulphate hardener was 1% w/w (hardener solids on resin solids), while the level of triethanolamine propionate hardener was 2% w/w (hardener solids on resin solids).

The hot press temperature used for the production of the boards was 240° C. The pressing time was 4 s/mm. The dimensions of the boards were 45×45×1.5 cm and the target board density was 630 kg/m$^3$.

The mechanical properties of the boards thus obtained were determined according to the European standards EN 310 (Bending strength (MOR) and Bending stiffness/Modulus of elasticity (MOE)) and EN 319 (Tensile strength/Internal bond (IB)) and the results are presented in Table 7:

TABLE 7

| | Formulation | | | | | |
|---|---|---|---|---|---|---|
| | 1 | 2 | 3 | 4 | 5 | 6 |
| Hardener type | $(NH_4)_2SO_4$ | $(NH_4)_2SO_4$ | $(NH_4)_2SO_4$ | $(NH_4)_2SO_4$ & LH1 | $(NH_4)_2SO_4$ & LH1 | $(NH_4)_2SO_4$ & LH1 |
| Hardener level | 3% | 3% | 3% | 1% & 2% | 1% & 2% | 1% & 2% |
| Hardener addition method | In the core mix | In the surface mix | Sprayed on surface layers | In the core mix | In the surface mix | Sprayed on surface layers |
| IB, N/mm$^2$ | 0.45 | 0.13 | 0.09 | 0.28 | 0.45 | 0.48 |
| MOR, N/mm$^2$ | 12.4 | 9.7 | 9.2 | 11.5 | 11.8 | 12.6 |
| MOE, N/mm$^2$ | 2340 | 1550 | 1540 | 2280 | 2540 | 2680 |

From the above data and results obtained it is made obvious that there is a strong catalysis effect of the proposed novel hardeners, as in all methods of adding the novel hardeners only in the surface layers of the boards, an improvement of the board properties is observed as compared to the properties of the reference boards. This implies that complete curing of the formaldehyde-based and/or polymeric isocyanate resins used can be achieved in the core layers of the boards too, and although no hardener has been added therein.

The invention claimed is:
1. A composite structure comprising:
   a mat of ligno-cellulosic materials having at least:
      a first layer of the ligno-cellulosic materials combined with a first glue mix, the first glue mix of the first layer including a resin based on at least one of formaldehyde and polymeric isocyanate;
      a second layer of the ligno-cellulosic materials combined with a second glue mix, the second glue mix of the second layer also including the resin based on at least one of formaldehyde and polymeric isocyanate; and a third layer of the ligno-cellulosic materials combined with a third glue mix, the third glue mix of the third layer also including the resin based on at least one of formaldehyde and polymeric isocyanate;
   a resin hardener formed by a salt having an acid moiety and a base moiety;
   wherein one of the acid moiety and the base moiety of the resin hardener is a more volatile moiety, the more volatile moiety activating hardening of the resin in the first glue mix of the first layer upon vaporization;
   wherein the second and third layers are surface layers of the mat and the first layer is a core layer located therebetween; and
   wherein the resin hardener is not in the first glue mix of the first layer, the resin hardener being instead either:
      sprayed onto only outer surfaces of surface layers of the mat; or
      included in the second and third glue mixes of the second and third layer of the ligno-cellulosic materials, respectively.

2. The composite structure of claim 1, wherein the resin includes a urea-formaldehyde resin, a melamine-formaldehyde resin, a phenol-formaldehyde resin, a resorcinol-formaldehyde resin or a combination of the aforementioned resins.

3. The composite structure of claim 1, wherein the resin is derived from the reaction of diphenylmethane diisocyanate (MDI), toluene diisocyanate (TDI), hexamethylene diisocyanate (HDI) or isophorone diisocyanate (IPDI) with poly-hydroxy functional compounds.

4. The composite structure of claim 1, wherein the composite structure is shaped to form a particleboard, a medium density fibreboard, a high density fibreboard, an oriented strand board or plywood.

5. The composite structure of claim 1, wherein the mat further includes a third layer, both the second and third layers being the surface layers with the first layer being a core layer located therebetween; and wherein the resin hardener is included in the second glue mix of the second layer and in a third glue mix of the third layer.

6. The composite structure of claim 1, wherein conventional curing catalysts are in at least the first glue mix.

\* \* \* \* \*